Feb. 25, 1930.   B. VALLANCE   1,748,907
MOTION TRANSMITTING MECHANISM
Filed March 22, 1929
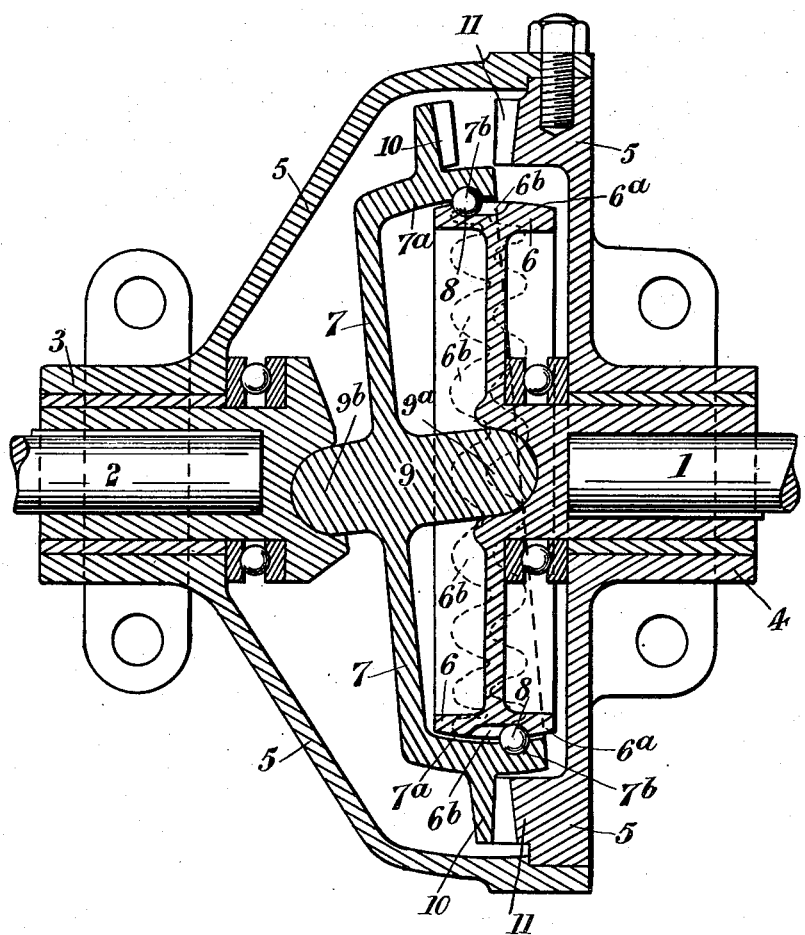
INVENTOR
BERTRAM VALLANCE
by his attorneys
Howson and Howson

UNITED STATES PATENT OFFICE

BERTRAM VALLANCE, OF WESTCLIFF-ON-SEA, ENGLAND

MOTION-TRANSMITTING MECHANISM

Application filed March 22, 1929, Serial No. 349,109, and in Great Britain March 5, 1928.

My invention relates to means for transmitting rotary motion from a driving element to a driven element and has for its object to provide an improved and simplified gear by which rotary motion can be transmitted from a driving element to a driven element at a predetermined reduced, or increased, speed with greater facility than hitherto.

According to my invention the means for transmitting rotary motion from a rotatable element to another rotatable element comprises a plate, ring, or its equivalent, connected to the said rotatable elements by means such that rotation of one of the said elements causes the said plate, ring, or its equivalent, to tilt, or oscillate, in such manner that every point in its circumference moves in a lemniscate path and effects rotation of the other one of the said elements at an invariable reduced speed, or at an invariable increased speed. This may be effected by tilting, or oscillating the plate, ring, or its equivalent, on a head on one of the rotatable elements, the said plate, ring, or its equivalent and the element on which it tilts, or oscillates, having complementary spherically curved opposed surfaces in one of which is formed an endless undulating groove, or channel, and in the other of which is formed recesses each adapted to retain a ball, roller, or projection (hereinafter referred to as a ball) therein and in engagement with the said groove or channel. The tilting, or oscillating plate, ring, or its equivalent, is operatively connected to the other one of the said rotatable elements preferably by means of a central stem which is connected, by a ball and socket connection, to a part of the said element eccentric to its axis. Assuming the rotatable element having the head upon which the plate, ring, or its equivalent, is the driven element, the other, or driving, element during its rotation causes the said plate, ring, or its equivalent, to continuously tilt, or oscillate, on the head in such manner that every part in the circumference of the said plate, ring, or its equivalent, is moved in one direction and simultaneously therewith the diametrically opposite part thereof is moved in the opposite direction similarly to the wobbling motion of a swash-plate and by the conjoint action of the balls and the endless undulating groove, or channel effects the rotation of the said driven element at a reduced speed to that of the driving element. If desired the aforesaid rotatable element having the head upon which the plate, ring, or its equivalent, tilts, or oscillates, may be the driving element in which case the other rotatable element would be the driven element and this would be rotated at any increased speed to that of the rotatable element having the said head.

The accompanying drawing illustrates, in section, an example of means, in accordance with my invention, for transmitting rotary motion from one rotary element to another but it is to be understood that the invention is not limited to the example shown as modifications may be made without departing from the scope of the invention.

Referring to the drawing 1 and 2 indicate two aligned rotatable shafts the adjacent ends of which are shown rotatably mounted in bearings 3 and 4, respectively, formed on a stationary casing 5 enclosing the said ends and the gear therebetween. For the purpose of description the rotatable element 1 will be hereinafter referred to as the driven element and the rotatable element 2 the driving element. The driven element 1 is provided with a head 6 upon which a plate, ring, or its equivalent 7 (hereinafter referred to as the driving ring) is caused to tilt, or oscillate. The head 6 and the driving ring 7 have complementary spherically curved opposed surfaces $6^a$ and $7^a$ respectively, in the former of which is an endless undulating groove, or channel, $6^b$ with which a series of balls 8 retained in hemispherical recesses $7^b$ in the said spherically curved surface $7^a$ engage. The driving ring 7 is provided with a central stem 9 one end $9^a$ of which is supported by a ball and socket connection, as shown, in the centre of the head 6 of the driven element 1 and the other end $9^b$ of which is supported by another ball and socket connection, as shown, to the driving element 2 at a predetermined distance from the axis thereof, i. e. the socket center in the driving element is eccentric to the longitudinal axis of the driving element, so that by the rotation of the said driving element the said driving ring is caused to tilt, or oscillate, the desired degree on the said head in such manner that every point in its circumference moves in a lemniscate path, that is a path resembling a uniform figure 8 inscribed on a sphere and by its movement causes the whole of the balls 8, or the equivalent, to simultaneously bear on the walls of the endless undulating groove, or channel, 6$^b$ and thereby rotate the driven element 1 at a reduced speed to that of the driving element 2. Any suitable means may be provided for preventing the driving ring 7 from rotating. This is shown as being effected by a bevel wheel 10 formed on the circumference of the said driving ring, some of the teeth of which engage, during the tilting, or oscillating, movement with the teeth of a bevel wheel 11 secured to, or forming part of, the stationary gear casing 5.

Instead of transmitting rotary motion from the element 2 to the rotatable element 1, as hereinbefore described, the motion may be transmitted from the said rotatable element 1 to the rotatable element 2 in which case the endless undulating groove, or channel, 6$^b$, in the rotating head 6 would, through the series of balls 8, or the equivalent, cause the driving ring 7 to tilt, or oscillate and thereby effect through the end 9$^b$ of its stem 9 the rotation of the element 2 at an increased speed to that of the rotating element 1.

If desired the endless undulating groove, or channel, may be formed in the inner spherical surface 7$^a$ of the driving ring 7 and the hemispherical recesses 7$^b$ for the balls 8, or the equivalent, be formed in the opposed spherical surface 6$^a$ of the head 6, and also, if desired, more than one endless undulating groove, or channel, may be provided and a corresponding number of series of balls, or the equivalent, be employed.

In the foregoing description and in the following claims, I have spoken of the driving ring as tilting, or oscillating. It should be noted that by such description I mean to describe that motion imparted to the driving ring by rotating one end of the spindle upon which the driving ring is mounted, in the path of a circle whose center is the axis of the shaft 2, while the other end of the spindle is held stationary, relative to the axis of the shaft 1.

What I claim is:

1. Means for transmitting rotary motion from one rotatable element to another rotatable element in axial alignment therewith, one of said elements having a head thereon; the said means comprising a driving ring adapted to tilt, or oscillate on said head, the said driving ring and the said head having complementary spherically curved opposed surfaces; a stem on the said driving ring having one of its ends supported in the center of said head and its other end supported eccentrically in the opposed end of the other rotatable element so that the longitudinal axis of the said stem is inclined to the longitudinal axes of the said rotatable elements; an endless undulating groove formed in one of the said opposed spherically curved surfaces; recesses formed in the other one of the said opposed surfaces each of which is adapted to retain a ball therein and in engagement with said groove, and means for preventing rotation of said driving ring.

2. Mechanism for transmitting rotary motion, comprising a rotatable element, a second rotatable element in axial alignment with said first rotatable element, a head on one of said rotatable elements, driving ring means mounted on a stem, one end of said stem being seated in the center of said head, the other end of said stem having eccentric engagement with said other rotatable element whereby the longitudinal axis of said stem is inclined to the longitudinal axis of said rotatable elements, said driving ring means and head having complementary curved surfaces, an undulating groove in one of said curved surfaces, recesses in the other of said curved surfaces, ball means cooperating with said recesses and grooves whereby motion may be transmitted from said head to said driving ring means or from said driving ring means to said head, and means preventing the rotation of said driving ring.

3. Mechanism for transmitting rotary motion, comprising a rotatable element, a second rotatable element in axial alignment with said first rotatable element, a head on one of said rotatable elements, driving ring means mounted on a stem, one end of said stem being seated in the center of said head, the other end of said stem having eccentric engagement with said other rotatable element whereby the longitudinal axis of said stem is inclined to the longitudinal axis of said rotatable elements, said driving ring means and head having complementary curved surfaces, an undulating groove in one of said curved surfaces, recesses in the other of said curved surfaces, ball means cooperating with said recesses and grooves whereby motion may be transmitted from said head to said driving ring means or from said driving ring means to said head.

4. Means for transmitting rotary motion, comprising driving and driven rotary elements, in axial alignment with each other, in combination with a non-rotary ring, said non-rotary ring having pivotal connection with said driving and driven elements, and means upon one of said elements and said ring whereby the rotation of the driving element causes the ring to tilt or oscillate without rotating, in such a manner that all points in the circumference of said ring move in a lemniscate path to effect rotation of the driven element at an invariable speed ratio to the driving element.

In testimony whereof I have signed my name to this specification.

BERTRAM VALLANCE.